United States Patent
Greenberg et al.

(10) Patent No.: US 10,339,380 B2
(45) Date of Patent: Jul. 2, 2019

(54) HI-FIDELITY COMPUTER OBJECT RECOGNITION BASED HORTICULTURAL FEEDBACK LOOP

(71) Applicant: iUNU, Inc., Seattle, WA (US)

(72) Inventors: Adam Phillip Takla Greenberg, San Francisco, CA (US); Matthew Charles King, Seattle, WA (US)

(73) Assignee: IUNU, Inc., Seattle, WA (US)

( * ) Notice: Subject to any disclaimer, the term of this patent is extended or adjusted under 35 U.S.C. 154(b) by 0 days.

(21) Appl. No.: 15/271,569

(22) Filed: Sep. 21, 2016

(65) Prior Publication Data
US 2018/0082412 A1    Mar. 22, 2018

(51) Int. Cl.
 G06K 9/00    (2006.01)
 A01G 7/00    (2006.01)
 G06T 7/00    (2017.01)

(52) U.S. Cl.
 CPC ......... *G06K 9/00657* (2013.01); *A01G 7/00* (2013.01); *G06K 2209/17* (2013.01); *G06T 7/00* (2013.01); *G06T 2207/30188* (2013.01)

(58) Field of Classification Search
 None
 See application file for complete search history.

(56) References Cited

U.S. PATENT DOCUMENTS

| | | |
|---|---|---|
| 7,013,284 B2 | 3/2006 | Guyan et al. |
| 7,184,846 B2 | 2/2007 | Albright et al. |
| 8,594,375 B1 * | 11/2013 | Padwick ............. G06K 9/0063 382/103 |
| 8,613,158 B2 | 12/2013 | Conrad |
| 8,850,742 B2 | 10/2014 | Dubé |
| 9,565,812 B2 | 2/2017 | Wilson |
| 10,002,375 B1 | 6/2018 | Scythes et al. |
| 2009/0005247 A1 | 1/2009 | Spiegel et al. |
| 2009/0132543 A1 | 5/2009 | Chatley et al. |

(Continued)

FOREIGN PATENT DOCUMENTS

| | | |
|---|---|---|
| JP | 2011103870 A | 6/2011 |
| KR | 20130005540 A | 1/2013 |

(Continued)

OTHER PUBLICATIONS

Non-Final Office Action for U.S. Appl. No. 15/891,110, dated Jul. 13, 2018, 15 pages.

(Continued)

*Primary Examiner* — Justin P. Misleh
(74) *Attorney, Agent, or Firm* — Han Santos, PLLC

(57) ABSTRACT

Infrastructure and methods to implement a feedback loop for a horticultural operation are disclosed. Image capture devices are deployed on a per plant or near per plant basis, and upload images to image analysis server. The image analysis server applies image preprocessing to the uploaded images, and then applies image analysis to identify plants and plant artifacts. Where artifacts indicate an issue with a plant, a course of action to remediate is identified. Static analysis techniques, sequential analysis techniques, and adaptive techniques are some of the techniques enabled and disclosed by the application of object recognition techniques to horticultural applications. Images may be associated with a plant state vector to enable complex comparison operations.

19 Claims, 7 Drawing Sheets

(56) References Cited

U.S. PATENT DOCUMENTS

| | | | |
|---|---|---|---|
| 2010/0305966 A1 | 12/2010 | Coulter et al. | |
| 2013/0235183 A1* | 9/2013 | Redden | G06K 9/2036 348/89 |
| 2013/0332205 A1 | 12/2013 | Friedberg et al. | |
| 2014/0115958 A1 | 5/2014 | Helene et al. | |
| 2014/0168412 A1 | 6/2014 | Shulman et al. | |
| 2014/0176688 A1 | 6/2014 | Ibamoto | |
| 2015/0015697 A1 | 1/2015 | Redden et al. | |
| 2015/0120349 A1 | 4/2015 | Weiss | |
| 2015/0227707 A1 | 8/2015 | Laws et al. | |
| 2015/0230409 A1 | 8/2015 | Nicole et al. | |
| 2015/0261803 A1* | 9/2015 | Song | G06K 9/4671 707/797 |
| 2016/0026940 A1 | 1/2016 | Johnson | |
| 2016/0140868 A1 | 5/2016 | Lovett et al. | |
| 2016/0148104 A1 | 5/2016 | Itzhaky et al. | |
| 2016/0205872 A1 | 7/2016 | Chan et al. | |
| 2016/0239709 A1* | 8/2016 | Shriver | G06K 9/00657 |
| 2016/0345517 A1* | 12/2016 | Cohen | A01G 31/02 |
| 2017/0039657 A1 | 2/2017 | Honda et al. | |
| 2017/0064912 A1 | 3/2017 | Tabakman | |
| 2017/0300846 A1 | 10/2017 | Harwood | |

FOREIGN PATENT DOCUMENTS

| | | |
|---|---|---|
| KR | 20140077513 A | 6/2014 |
| KR | 20140114089 A | 9/2014 |
| KR | 20150000435 A | 1/2015 |

OTHER PUBLICATIONS

International Search Report and Written Opinion for PCT Application No. PCT/US2017/052800 dated Jan. 16, 2018, 14 pages.

International Search Report and Written Opinion for PCT Application No. PCT/US2017/052805 dated Jan. 9, 2018, 14 pages.

Augustin et al., "A framework for the extration of quantitative traits from 2D images of mature *Arabidopsis thaliana*," Machine Vision and Applications (Oct. 16, 2015), 15 pages. See abstract; and sections 3-4.

Nagasai, et al., "Plant Disease Identification using Segmentation Techniques," International Journal of Advanced Research in Computer and Communication Engineering, vol. 4, Issue 9, (Sep. 2015), pp. 411-413. See abstract; and pp. 411-412.

Patil et al., "A Survey on Methods of Plant Disease Detection," International Journal of Science and Research (IJSR), vol. 4, Issue 2, (Feb. 2015), pp. 1392-1396. See pp. 1392-1395.

Sannakki et al., "Comparison of Difference Leaf Edge Detection Algorithms Using Fuzzy Mathematical Morphology," International Journal of Innovations in Engineering and Technology (IJIET), vol. 1, Issue 2 ( (2012), pp. 15-21. See pp. 15-20.

U.S. Appl. No. 15/891,110, Final Office Action, dated Dec. 17, 2018, 15 pages.

U.S. Appl. No. 15/271,658, Office Action, dated Sep. 9, 2018, 10 pages.

U.S. Appl. No. 15/271,630, Office Action, dated Sep. 26, 2018, 20 pages.

U.S. Appl. No. 15/271,727, Office Action, dated Oct. 2, 2018, 22 pages.

U.S. Appl. No. 15/271,630, Final Office Action dated Apr. 17, 2019, 11 pages.

U.S. Appl. No. 15/271,727, Final Office Action dated Apr. 25, 2019, 22 pages.

Vaglica, "Shrub Pruning Dos and Donts", Aug. 3, 2016, https://www.thisoldhouse.com/ideas/shrub-pruning-dos-and-donts (Year: 2016).

* cited by examiner

HI-FIDELITY COMPUTER OBJECT RECOGNITION BASED HORTICULTURAL FEEDBACK LOOP

BACKGROUND

Modern industrial horticultural operations include not merely the planting, cultivation and harvesting of plants, but performing those operations with multiple plants, conditions, greenhouses, grow operations, people, all in different geographic locations. Accordingly, collection and marshalling of this information towards a coherent and effective horticultural operation is difficult. Generally a master grower regularly collects information about a horticultural operation, identifies problems, identifies solutions for those problems and applies them for remediation. This monitoring and remediation cycle may be called a horticultural feedback loop.

Specifically, because the environments surrounding different respective grow operations varies widely, and much information is spread over different locations, collection of information for a horticultural operation is difficult in the first place. Furthermore, information collected is generally of low fidelity, of dubious provenance, untimely, incomplete, and does not lend itself for determining a course of remedial action, let alone coordinate, operation-wide response. Even where information is collected in a centralized location, the information is not in a state to perform automated hi-fidelity and therefore accurate diagnosis and remediation.

An effective horticultural feedback loop is based on information collection and remediation based on the collected information. Accordingly, without hi-fidelity, reliable, timely, and complete information, and without central storage and automated diagnosis and remediation, the ability for to implement an effective horticultural operational feedback loop, let alone an automated horticultural feedback loop is therefore compromised.

BRIEF DESCRIPTION OF THE DRAWINGS

The Detailed Description is set forth with reference to the accompanying figures.

DETAILED DESCRIPTION

Figure 1:
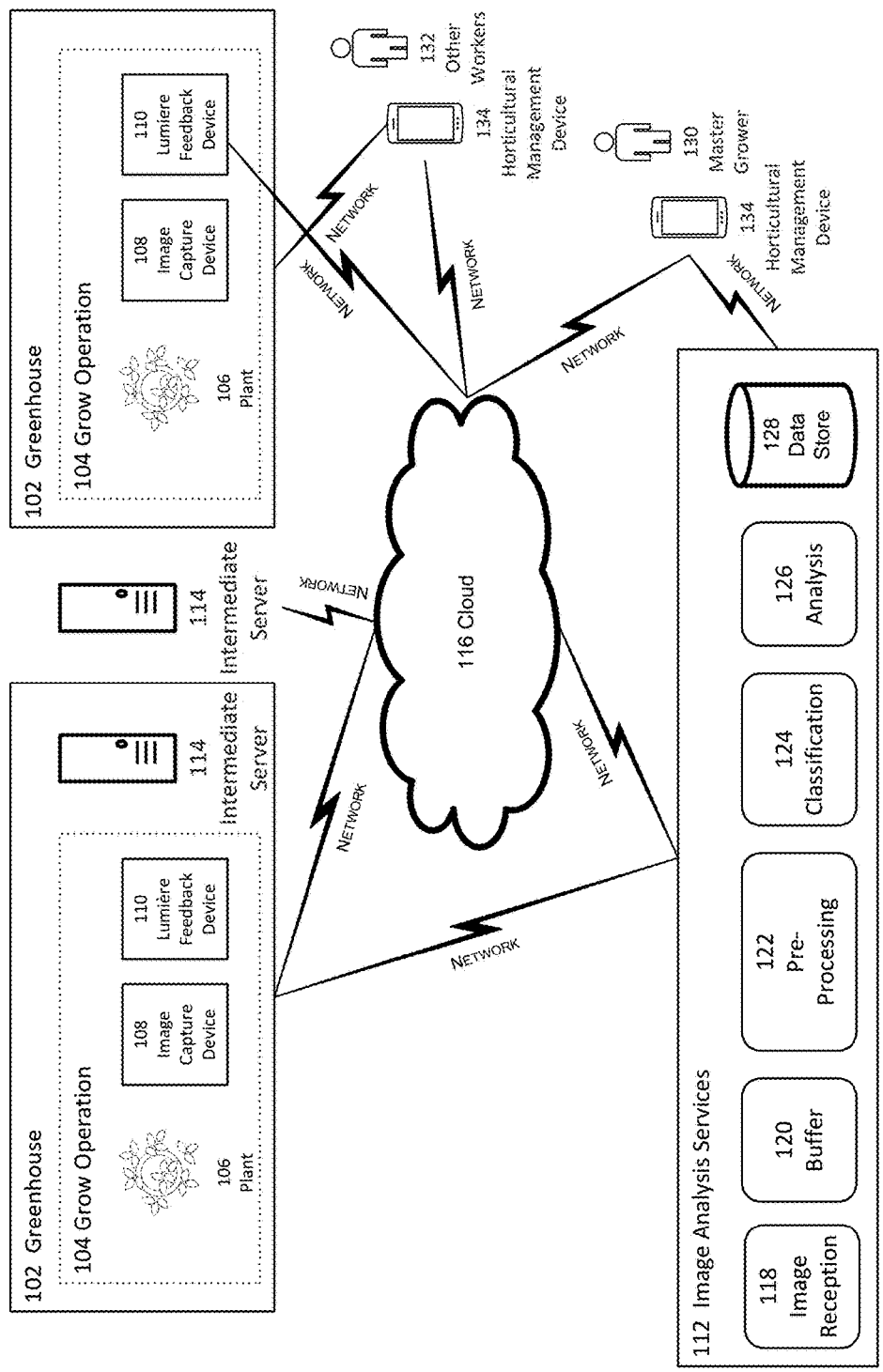
FIG. 1 is a top level context diagram for object recognition horticultural based feedback analysis.

Context of Object Recognition Based Horticultural Feedback Analysis
Overview

As stated above, a horticultural feedback loop is the regular and periodic monitoring of a horticultural operation to collect information about the operation, and to identify problems in the operation, solutions to those problems, to perform remediation. As a horticultural operation may include planting, cultivation and harvesting of plants. Accordingly, information to be collected in a horticultural feedback loop will include at least spot checks on at least some plants. With prior art, due to the labor intensive nature of horticultural, manual spot checks, rather than comprehensive plant by plant analysis is impractical.

Furthermore, there are a large number of variables including factors that may vary across location, e.g. people, climate, mechanical problems, and the like, that provide contextual information around plant measurements. Generally, with prior art, environmental variables and other non-plant variables are not collected effectively.

Herein is disclosed Object Recognition Based Horticultural Feedback Analysis (ORB-HFA). Specifically, with ORB-HFA, each plant is constantly and continuously monitored with an image capture device, such as digital video camera, or a still image digital camera scheduled to take still images periodically. The images are then collected, centralized, and then analyzed using computer object-recognition techniques and computer image analysis techniques to provide a critical mass of information for accurate automated diagnosis and recommendations for remediation.

A first consequence of ORB-HFA is the completeness and speed that remediation recommendations may be dispatched to workers. Since the individual plants and their respective environments are being constantly monitored, ORB-HFA enables real-time response and monitoring. A remediation recommendation may be dispatched on one day, and a follow-up to determine efficacy of the remediation recommendation may be performed later that same day.

A second consequence of ORB-HFA is the comprehensive collection of data across an entire horticultural operation. Every plant is monitored. Every plant's environment is monitored. Additional variables are monitored. The data is also stored for historical purposes. Accordingly, the state of every plant may be monitored at all times and individually cared for as needed. Accordingly, a plant may be compared to the performance of past similar plants, or to the performance of other plants in the same horticultural operation. In general, ORB-HFA aggregates a critical mass of data to provide historical information will allow a master grower to incorporate past experience in determining potential remediation courses of action. Some analysis may make use of machine learning/big data techniques. The results of this analysis may then be fed back into an ORB-HFA system to improve future diagnosis and remediation recommendations.

Third, ORB-HFA permits the application of the full range of computer object-recognition techniques and computer image analysis techniques. Using such techniques, not only can each plant be monitored, but also each branch, each leaf (or needle) and every root and their topology may be analyzed. Furthermore, using color techniques, changes in color, such as the premature browning of leaves, may be immediately detected. Moreover, since each plant is being monitored, sequential analysis—the comparison of images over time, may be applied to capture changes over time. None of these three advantages, as well as other ORB-HFA advantages not introduced here, are available in the prior art.

FIG. 1 provides an exemplary context diagram 100 illustrating a ORB-HFA feedback loop.

A horticultural operation may cover one or more locations, such as a greenhouse 102. A greenhouse 102 may have one or more grow operations 104 each with one or more plants 106. Notwithstanding FIG. 1, a single grow operation 104 may include multiple plants in different locations/greenhouses 102. Specifically, a grow operation 104 is a logical grouping of plants 106 that are similarly situated such that the cultivation of each plant in the group is substantially similar.

As per a horticultural feedback loop, information of the plants is to be captured. This is accomplished with an image capture device 108. Each plant 106 is monitored by at least one image capture device 108. In some embodiments, each individual plant may have a single dedicated image capture device 108. The image capture device may be a digital video camera, or may be a still image camera configured to capture images periodically and/or on demand. Image capture device 108 is described in further detail with respect to FIG. 2.

The image capture device 108 may work in concert with a lumière feedback device 110. The lumière feedback device 110 provides light on a plant 106 and may be configured to change spectrum and intensity of the light on the plant 106 based on feedback from sensors. One of the sensors may be the image capture device 108 and the analysis of the images captured by the image capture device 108. In some embodiments, the lumière feedback device 110 may incorporate the image capture device 108. Furthermore, the lumière feedback device 110 may be networked. Accordingly, the lumière feedback device 110 may simply use internal logic to capture images with the image capture device 108, and adjust light spectrum and/or intensity. Alternatively, the lumière feedback device 110 may share images and other information to a central location for further analysis. Upon completion of this analysis, the lumière feedback device 110 may be configured to adjust light spectrum and/or intensity according to a remediation course of action, comprising one or more tasks to address an identified problem, thereby completing one potential feedback.

Where the lumière feedback device 110 is to share images and other information to a central location containing image analysis services 112, the lumière feedback device 110 may either send images directly to those image analysis services 112, or may queue those images in an intermediate server 114 which in turn may subsequently forward those images to the image analysis services 112. The intermediate servers may directly send images to those services 112 if the services 112 are on the same network. Alternatively, the intermediate servers 114, or may route images to the image analysis services 112 via the internet and/or cloud services 116. In other embodiments, the image analysis services may be hosted in a virtual machine on the cloud. In some cases, the intermediate server 114 may be on premises, or alternatively, may be hosted off premises. The configuration of an intermediate server 114 and of cloud services 116 are described in further detail with respect to FIG. 2.

The image analysis services 112 may comprise a plurality of individual services to perform an analysis workflow on images. Those services may include one or more image reception software components 118 to receive images sent by image capture devices 108, lumière feedback devices 110, intermediate servers 114, or other sources of a grow operation 104.

The one or more image reception software components 118 will then place one or more images in a memory buffer 120 where additional image processing services will be applied. Specifically, one or more image preprocessing software components 122, one or more classification software components 124, one or more analysis software components 126 may be applied to an image in a buffer 120.

Once the applications are completed, an image in a buffer 120 may be persisted and aggregated in a data store 128. The configuration of the software components, buffer, and data store comprising image analysis services 112 is described in further detail with respect to FIG. 2. The operation of the software components, buffer, and data store comprising image analysis services 112 is described in further detail with respect to FIG. 4.

The result of the image analysis services 112 is not only to analyze received images, but also to identify problems and to identify potential solutions. Specifically, once received images are analyzed, a course of action for remediation may be identified. Once the image analysis services 112 identifies at least one course of action for remediation, it may interact directly with a grow operation via the image capture device 108, the lumière feedback devices 110, intermediate servers 114, or other interfaces to a grow operation 104.

Alternatively, one or more course of actions for remediation may be transmitted to a master grower or junior grower 130 responsible for at least one grow operation and/or a line worker 132 who is to perform the actual tasks comprising a course of action for remediation. In one embodiment, all or a portion of the course of action for remediation may be displayed in a horticultural management device 134 for view and interaction by the master grower 130 and/or line worker 132. The horticultural management device 134 may be any networked computer, including mobile tablets over Wi-Fi and/or mobile tablets over a cellular network and/or laptops. The horticultural management device 134 may connect to the cloud 116, directly to the image analysis services 112, or directly to the grow operation 104, via intermediate servers 114, lumière feedback devices 110, image capture devices 108, or other interfaces to the grow operation 104.

Accordingly, ORB-HFA enables the collection of complete and comprehensive information collection, potentially to the point of one dedicated image capture device 106 per plant, the offloading of sophisticated image analysis services 112 to a central point for analysis and determining a course of action for remediation as needed, and the distribution of the course of action for remediation either directly with a grow operation, or to individuals 130 and 132 responsible for the grow operation. In this way, ORB-HFA enables an improved horticultural feedback loop over the prior art.

Exemplary Hardware, Software and Communications Environment

Figure 2:
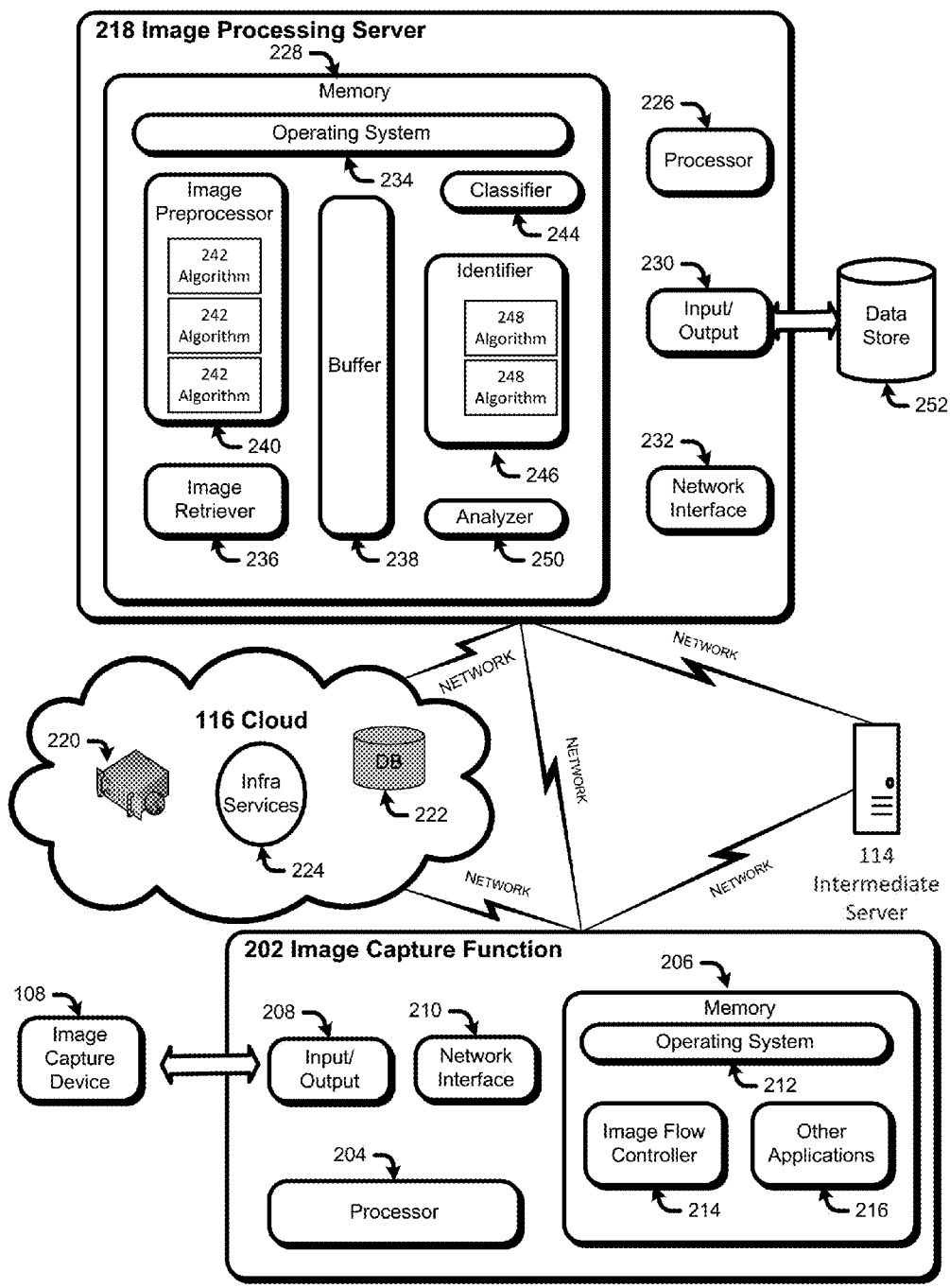
FIG. 2 is a block diagram of an exemplary hardware, software and communications environment for object recognition based horticultural feedback analysis.

Prior to disclosing Object Recognition Based Horticultural Feedback Analysis (ORB-HFA) and related techniques, an exemplary hardware, software and communications environment is disclosed. FIG. 2 illustrates several possible embodiments of a hardware, software and communications environment 200 for ORB-HFA and related techniques.

Image Capture

Images are captured via an image capture device 108. As described above, the image capture device 108 may be a digital video camera or a digital still camera configured to capture images periodically and/or on demand. Generally an image capture device 108 may take visible light spectra pictures, but may also extend to non-visible spectra such as infrared and ultraviolet. The image capture device 108 may have an on board application programming interface (API) enabling programmatic control. Alternatively the image capture device 108 may be networked thereby enabling remote control.

Control functions for image capture may be in a separate image capture function 202. The image capture function 202 may incorporate the image capture device 108 and may be part of a larger integrated device, such as a lumière feedback device 110. Indeed, the image capture function 202 may be part of a lumière feedback device 110.

Hardware for Image Capture Control Function

The image capture control function 202 is generally hosted on a computing device. Exemplary computing devices include without limitation personal computers, laptops, embedded devices, tablet computers, smart phones, and virtual machines. In many cases, computing devices are to be networked.

The computing device for the image capture control function 202 may have a processor 204, a memory 206. The processor may be a central processing unit, a repurposed graphical processing unit, and/or a dedicated controller such as a microcontroller. The computing device for the image capture control function 202 may further include an input/output (I/O) interface 208, and/or a network interface 210. The I/O interface 208 may be any controller card, such as an universal asynchronous receiver/transmitter (UART) used in conjunction with a standard I/O interface protocol such as RS-232 and/or Universal Serial Bus (USB). The network interface 210, may potentially work in concert with the I/O interface 208 and may be a network interface card supporting Ethernet and/or Wi-Fi and/or any number of other physical and/or datalink protocols.

Memory 206 is any computer-readable media which may store several software components including an operating system 212 and software components such as an image flow controller 214 and/or other applications 216. In general, a software component is a set of computer executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

Image Flow

The image flow controller 214 is a software component responsible for managing the capture of images, receiving images from the image capture device 108 (if not integrated with the image capture function 202) the local management of received images, and potentially the transmission of received images off the image capture function 202 over a network. The image flow controller 214 may store a configuration setting of how many images an image capture device 108 is to capture, the resolution the image is to be captured, the format the image is to be stored, and any other processing to be performed on the image. The image flow controller 214 may store a captured and/or received image into a buffer in the memory 206 and name the filename of the received image. Other applications 216 may be utilities to perform image processing, such as compression and/or encryption.

The image flow controller 214 may also manage the transmission of received images. Specifically, it may transmit an image to a known network location via the network interface 210. The known network locations may include an intermediate server 114, an internet and/or cloud location 116 or an image processing server 218.

Upon transmission, the image flow controller 214 may enlist in notifications to determine that the transmission was successful. The image flow controller 214 may also transmit notifications to other device subscribing to its notifications indicating status of a transmission.

Intermediate Server

The image capture function 202 may communicate to an intermediate server 114. The intermediate server 114 is any computing device that may participate in a network. The network may be, without limitation, a local area network ("LAN"), a virtual private network ("VPN"), a cellular network, or the Internet. The intermediate server 114 is similar to the host computer for the image capture function. Specifically, it will include a processor, a memory, an input/output interface and/or a network interface. In the memory will be an operating system and software components to route images. The role of the intermediate server 114 is to forward images received from the image capture functions 202 and to forward directly, if on the same network, to an image processing server 218, or via the internet and/or cloud 116. In some embodiments, the intermediate server may act as intermediate storage for images.

Cloud

A service on the cloud 116 may provide the services of an intermediate server 114, or alternatively may host the image processing server 218. A server, either intermediate 114 or image processing server 218 may either be a physical dedicated server, or may be a virtual machine. In the latter case, the cloud 116 may represent a plurality of disaggregated servers which provide virtual application server 220 functionality and virtual storage/database 222 functionality. The disaggregated servers are physical computer servers, which may have a processor, a memory, an I/O interface and/or a network interface. The features and variations of the processor, the memory, the I/O interface and the network interface are substantially similar to those described for the host of the image capture function 202, and the intermediate server 114. Differences may be where the disaggregated servers are optimized for throughput and/or for disaggregation.

Cloud services 220 and 222 may be made accessible via an integrated cloud infrastructure 224. Cloud infrastructure 224 not only provides access to cloud services 220 and 222 but also to billing services and other monetization services. Cloud infrastructure 224 may provide additional service abstractions such as Platform as a Service ("PAAS"), Infrastructure as a Service ("IAAS"), and Software as a Service ("SAAS").

Image Processing Server

The image processing server 218, is generally a computer server or on a cloud virtual machine. Where the image processing server 218 is a physical computer server, it may have a processor 226, a memory 228, an I/O interface 230 and/or a network interface 232. The features and variations of the processor 226, the memory 228, the I/O interface 230 and the network interface 232 are substantially similar to those described for the host of the image capture function 202, and the intermediate server 114.

Image Processing Server Software Components

The memory 228 of the image processing server 218, will store an operating system 234 and a set of software components to perform image analysis services 112. Those software components may include, an image retriever software component 236, an image buffer in memory 238, an image preprocessor software component 240 which may further include one or more image preprocessing algorithms 242, a classifier software component 244, an identifier software component 246 which may further include one or more identifier algorithms 248, and an analyzer software component 250.

The image retriever software component 236 manages the receiving of images from image capture functions 202. The throughput of images and supplementary data may differ. Accordingly, the image retriever software component 236, may manage the timing, speed, and the party controlling the data transfer. For example, it may act as a simple store, which receives and stores images upon receipt as pushed by an image capture function 202. Alternatively, it may affirmatively pull images for image capture functions.

One example of a pull scenario is where an image processing server 218 is first joining the network. When this happens, one or more image capture functions 202 could potentially overload the image processing server 218 by sending a large number of images. To prevent overload, the image retriever software component 236 will negotiate a controlled transfer with the one or more image capture functions 202. An example of negotiated controlled transfer is described with respect to FIG. 4.

When an image retriever software component receives an image 236, it may store the received image in an image buffer 238. An image buffer 238 is dedicated memory, generally part of the memory 228, where a retrieved image may reside to be processed. Common image buffers are contiguous dedicated RAM, where the data comprising an image may be accessed directly rather than via series of central processing unit commands. Generally such a configuration is via a Graphical Processing Unit.

Once an image is in the buffer 238, the image may be subjected to one or more image processing and analysis operations. An image preprocessor software component 240 performs any transformations to an image enable analysis to increase the likelihood of successful analysis. Example operations to enable analysis are to decompress and/or decrypt incoming images via the respective decompression and/or decryption algorithms 242. Example operations to increase the likelihood of successful analysis is to apply one or more transformations and/or content analysis algorithms 242 are Gaussian blur and Red-Green-Blue (RGB) content analysis. The aforementioned algorithms 242 as well as other algorithms 242 applied by the image preprocessor software component 240 is described in further detail with respect to FIG. 4.

Generally, analysis is performed later in the image workflow of the image processing server 218. Where possible, algorithms 242 attempt to take partial images, corrupt images, or otherwise substandard images and apply corrections sufficient to support analysis. However, the image preprocessing software component 240 may also contain logic to remove images with insufficient information or quality from the workflow. In this way, data collected during subsequent analysis will not contain data from corrupt or misleading images. This cleaning logic may be part of the image processing software component 240 or alternatively may be in a separate image cleaning software component.

Once preprocessing is complete, the classifier software component 244 is configured to identify which portions of an image represent the plant to be analyzed as opposed to portions of the image representing items other than the plant to be analyzed. The classifier software component 244 identifies discrete objects within the received image and classifies those objects by a size and image values, either separately or in combination. Example image values include inertia ratio, contour area, and Red-Green-Blue components. Based on those values, the objects are ranked and sorted. Items above a predetermined threshold, or the highest N objects are selected as portions of the received image representing the plant. The classifier software component 244 is described in further detail with respect to FIG. 4.

After classification, an identifier software component 246 is configured to identify the plant in the received image and to identify artifacts in the plant. This involves comparing the image data of the plant in the received image to that of other images. In order to perform those comparisons, the identifier software component 246 may create a plant state vector comprised of values and value sets generated by one or more algorithms 248 of the identifier software component 246. Such as constructed vector corresponds to the state of a plant in an image, and is compared against other plant state vectors to perform general comparisons as well as sequential analysis. The plant state vector is described in further detail with respect to FIG. 3. Sequential analysis is described in further detail with respect to FIG. 7.

The identifier software component 246 contains several identification algorithms 248. Some algorithms 248 work directly on a single image. Other algorithms 248 may process a series of images classified together into a category, collect information in common, and apply to subsequent images. Example categories may be images of the same plant over time, images of the same genus and species of plant, and images of plants given the same care.

One example of the latter case, is where the identifier software component 246 collects color histogram data over a plurality of images of the same category and generate an average histogram comprised of the averages or weighted averages of each distribution variable comprising the histogram. Accordingly, when an image is received belonging to the same category, the identifier software component 246 may use the average histogram to identify the plant and artifacts in the plant. The average histogram is then recalculated using the histogram of the incoming image. In this way, the average histogram becomes and adaptive histogram with improving performance. In some embodiments, the logic to perform analysis using data from a plurality of images, or performing computationally intense logic, may be separated from the identifier software component 246 into another software component such as an edge cleaner software component. This functionality and related functionality is described in further detail with respect to FIG. 4.

As previously mentioned, transforming a raw received image into a state that can be analyzed is only part of the function of the image processing server 218. Another function is the analysis of the transformed image. The analyzer software component 250 takes the transformed image, and potentially any generated additional information, such as a plant state vector, and maps portions of the image to indicia corresponding to a feature of a plant. This indicia is called an artifact. Because the classifier software component 244 identified objects comprising portions of a plant, those portions may be subjected to analysis of visual information. Because the identifier software component 246 may have generated branch information about plant branches, leaf structure, and root structure, branch analysis may identify not only artifacts but artifacts indicating issues in the plant.

If at least one artifact corresponds to an issue with a plant, the analyzer software component 250 may also retrieve corresponding recommended courses of action to remediate the issue. Such information may be subsequently sent to the grow operation 104, intermediate server 114, lumière feedback device 110, image capture device 108, and or other entry points into the grow operation 104.

The image processing server 218 may have access to a data store 252, either integrated (not shown) or accessible via network. The image processing server may store raw images, transformed images, generated plant state vectors, and other related information for archival and/or reporting after processing is complete. The data store 252 may be configured as a relational database, an object-oriented database, a NoSQL database, and/or a columnar database, or any configuration to support scalable persistence.

Reporting may be performed by a querying software component (not shown). Because each image is associated with a plant, date/time stamp, plant state vector, and potentially identified issues, images may be queried by any or all of these data values.

As described above, ORB-HFA provides infrastructure capable of collecting image and other information on a per plant basis, applying sophisticated image analysis, applying sophisticated horticultural analysis to diagnose problems and recommend a remedial course of action, all while distributing the relevant information to workers and or devices in the grow operation.

Exemplary Plant State Vector for Object Recognition Based Horticultural Feedback Analysis As stated above, a plant state vector is a data representation that captures the state of a plant as interpreted from an image. During image preprocessing, classification, and identification, as describe with respect to FIG. 2, image information is extracted via various image operations. That image information not only can be persisted in a plant state vector such that the information need not be recalculated, but also that information can act as a proxy for the plant during comparison operations. By comparing at least a portion of the plant state vector, a computer program may determine whether plants represented in different images should be analyzed together.

By way of example, if image A and image B may have similar metadata. For example both images may be known via their metadata to both contain a white orchid from the same greenhouse, a query may for those conditions may be applied to an image database and both those images might be retrieved, and the plants in image A and image B may be understood to be similarly situated so that they should be analyzed together. In this case, the plants in image A and image B are expected to have similar degrees of health because they are similarly situated. If they are not, then a grower will take an action to determine why there are differences.

However, a plant state vector, either alone, or in conjunction with image metadata can find comparable plants to a finer degree of resolution. If the plant state vector includes a branch analysis of a plant in an image, or includes a color histogram of the portions of the image relating to a plant, similarly situated plants can be retrieved in a query, even if they are in different greenhouses or grown in different times. In this way, a white orchid suffering from rot in a first greenhouse may be retrieved along with a white orchid suffering from rot in a second greenhouse, grown at a different time. As with the previous example, a grower will take an action to determine if there were similar causes.

In some cases a database may also contain suggestions for causes of an identified issue, in this case rot. Thus analysis by the grower may be aided by the database, or even automated.

There are many potential values that may be used for a plant state vector. Generally values chosen are to be mathematically transformational and translational invariant. Note that the five types of mathematical transformations are scaling, skewing rotation, reflection over a point and reflection over an axis. Also, a mathematical translation is a movement of an object in a particular direction through space. Specifically, even if a plant is moved, or rotated in the time between different images, the plant should be identifiable as the same plant.

Figure 3:
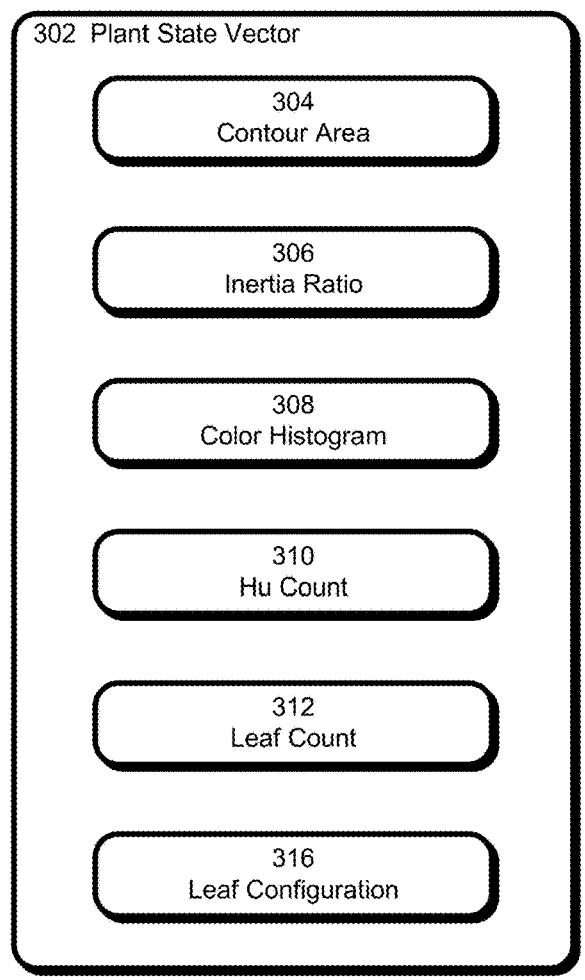
FIG. 3 is an exemplary plant state vector for object recognition based horticultural feedback analysis.

FIG. 3, is a diagram 300 of an exemplary plant state vector. It contains, the contour area 304, inertia ratio 306, color histogram 308, Hu count 310, leaf count 312, and leaf configuration 314 as calculated during preprocessing, classification, and identification as described with respect to FIG. 2.

Contour area 304 is a value from performing contour tracing, a technique used in feature recognition. Specifically, a tessellation is overlaid over an image, and a threshold color difference, and sometime a border pixel width, are specified to be interpreted as the border between features in an image. The contour area is performed during classification when the image is analyzed to identify plant and non-plant features, as well as during identification, where artifacts of the plant are identified. Upon performing a contour trace, the contour area is the area of the image known to represent the plant.

Inertia ratio 306 is a value from performing shape factor analysis, a technique used in determining how much a shape in an image deviates from an expected shape. For example, a portion of a plant may be identified as an artifact. When the artifact deviates from an expected shape, the deviation may be an indication of an issue with the plant. Inertia ratio 306 is a value calculated to indicate the degree of deviation. Specifically, it provides a measure of the long-ness of a shape with respect to the degree of symmetry. For example it can indicate how oval, a circular shape is.

A color histogram 308 is a pixel count organized into a histogram, where the histograms variables represent different colors. The colors may simply be red-green-blue, or may be of a greater spectrum of colors.

In one embodiment, contour area 304, inertia ratio 306, and the color histogram 308 may be used to determine the likeliness that a portion of an image is to be considered representing a plant. For example the following calculation may be used to rank image portions as likely representing a plant:

$$\text{Rank Value} = (\text{contour area} \times \text{inertia ratio}) \times [\text{green}/(\text{red} + \text{blue})]$$

For the plant state vector, the contour area 304, inertia ratio 306, and the color histogram 308 may be stored on a per image portion basis, or alternatively may be aggregated into a single contour area, inertia ratio, and color histogram for all the portions of the image deemed to represent a plant. Use of this rank value is described in further detail with respect to FIG. 4.

Hu count 310 is a count of Hu moments which are a form of image moments in image processing. An image moment is a measure of pixel intensity. In the alternative, the actual moment calculations, rather than just the count, may be stored and image moment calculations need not be Hu moments.

Leaf count 312 is a value of the count of leaves (or needles) in the portions of an image deemed to be a plant. Leaf configuration 314 is a representation of the position and orientation of the leaves (or needles) in space. Image analysis can identify the configuration of an arbitrary branch structure. Accordingly, a plant state vector may alternatively include vein structure of leaves, branches of the plant, and the root structure of a plant. In general, branching for leaves, needles, branches, and roots may be stored as a tree structure where edges store lengths and nodes store the identity and orientation of edges corresponding to branches in space.

Exemplary Workflow for Object Recognition Based Horticultural Feedback Analysis

Figure 4:
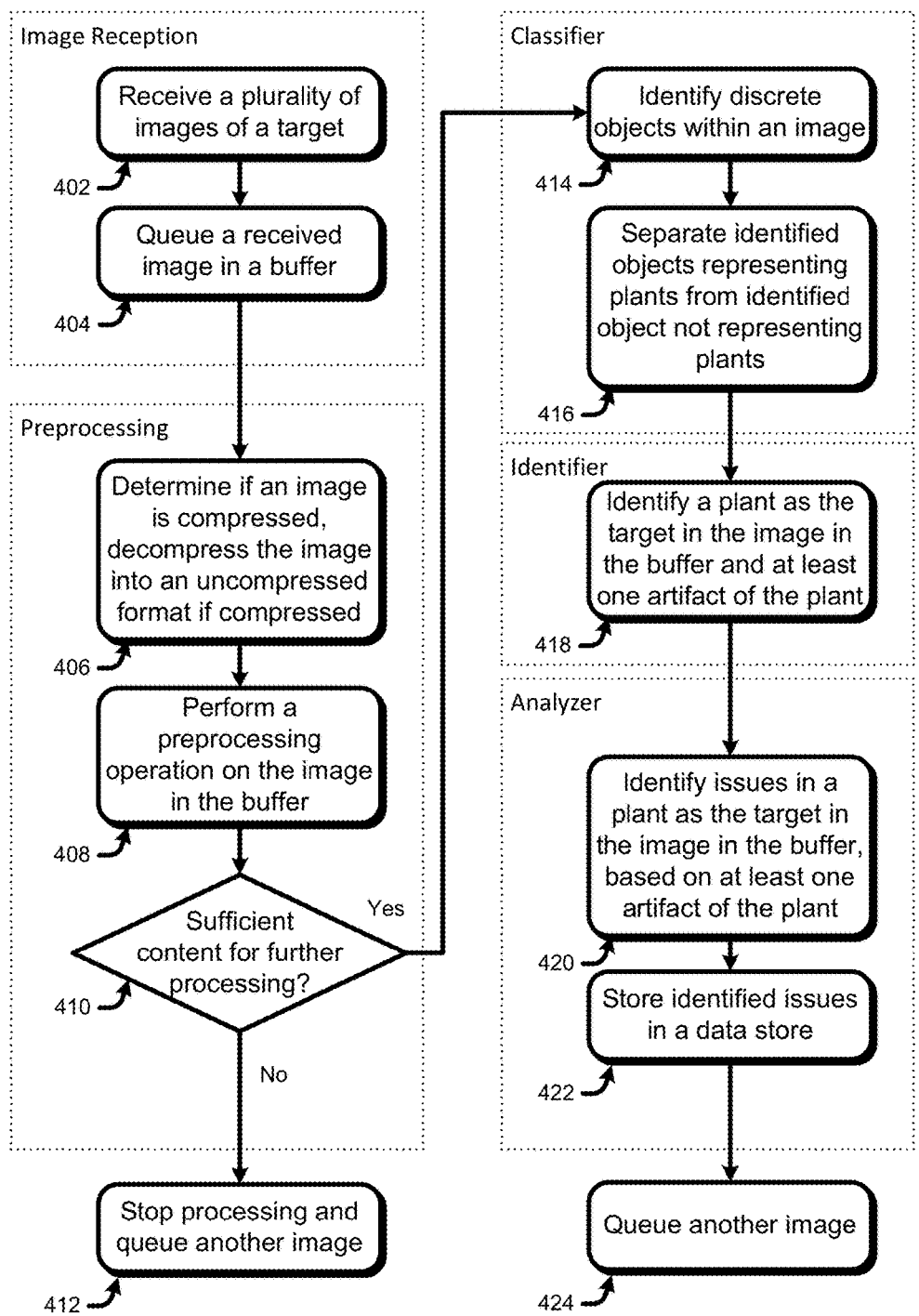
FIG. 4 is an exemplary flow chart of object recognition based horticultural feedback analysis.

FIG. 4 is a flow chart 400 of the generalized workflow for Object Recognition Based Horticultural Feedback Analysis (ORB-HFA). Portions of the workflow correspond to software components in the Image Processing Server 218 with respect to FIG. 2. Specifically, there are blocks corresponding to image reception, preprocessing, classification, identification and analysis.

Image reception is where an image is received, either via push or pull into an image processing server 218. One or more images may be received from a particular image capture function 202.

Because of the relative large amount of bandwidth used by image and/or video data, in one embodiment of block 402, an image retriever software component 236, may perform a negotiated bandwidth transfer of images. Specifically the image retriever software component 236 may query an image capture function 202 for the size of its image memory cache. Subsequently the image retriever software component 236 may then calculate the sum total image memory cache of all image capture functions 202 attempting to upload images. The image retriever software component 236 may then schedule uploads based on available bandwidth, whether an image capture function 202 is marked with high priority, and/or administrative intervention. In this way, image transfer may be performed during times with otherwise minimal network traffic and not interfere with other network use.

Regardless if images are pulled or pushed, and regardless of whether negotiated bandwidth transfer is implemented, in block 404 the image retriever software component will then store at least one image for processing in an image buffer 238.

Once buffered, preprocessing of the image starts in block 406. First the preprocessor 240 decompresses and/or decrypts the buffered image into its native format. In some cases, the native format of the buffered image may not be usable by preprocessing algorithms 242, identifier algorithms 248 or other algorithms to be used. In this case, the preprocessor may convert the buffered image from its native format to the applicable file format.

In block 408, the preprocessor 240 may then apply one or more preprocessing algorithms 242. Preprocessing algorithms 242 may be directed to filtering and/or enhancing, which increases contrast, pixel intensity, and other attributes to optimize image recognition. Preprocessing algorithms 242 may also be directed to eliminating noise. In general, preprocessing algorithms 242 are directed to any image processing operation that will aid subsequent classification and identification image processing.

Exemplary image processing algorithms 242 may include the pre-calculation and generation of a red-green-blue histogram or other histogram with pixel color counts as a variable. Alternatively, the histogram may be a hue-luminance-saturation histogram of colors. This generated color histogram may be stored in plant state vector as described with respect to FIG. 3. In some cases, the color histogram pre-calculation may be used with an adaptive histogram aggregating information from a plurality of images. Adaptive histograms are described with respect to FIG. 5.

Other exemplary image processing algorithms 242 may include a count of mathematical morphological operations. Mathematical morphology is an application of mathematics to image processing to determine shape and spatial attributes such as shape, size, convexity, connectivity, and geodesic distance. Those attributes may be manipulated using morphological operations such as erosion, dilation, opening and closing. For example, an algorithm 242 may count the number of morphological opens and closes to help determine sub-shapes in an image.

Other exemplary image processing algorithms 242 may apply a transform to the image to make the image clearer or otherwise easier to discern features during classification and identification. One example algorithm 242 is Gaussian smoothing which applies a Gaussian function on a per pixel basis in an image. In this way, pixels with high contrast with respect to neighboring pixels are attenuated to lower contrast base on the Gaussian function.

Other exemplary image processing algorithms may apply filters to the image which while removing information, increase contrast to better discern features during classification and identification. One example algorithm 242 is Otsu segmentation. Specifically, Otsu segmentation is the setting of one or more filters using a color attribute such as hue, luminance or saturation, or alternatively red-green-blue value, to segment an image into zones, each zone having its own color in high contrast with respect to neighboring segments. Otsu segmentation generally transforms an image into grayscale zones. The resulting image may then be used as a filter or stencil with respect to the original image.

In block 410, the image preprocessor software component 240 may determine that the image buffer is a duplicate or a partial or corrupt file. Alternatively the image preprocessor software component 240 may determine that there is not enough usable information in the buffered image.

Where a buffered image is identified or is irretrievably corrupted (i.e. cannot be opened), the buffered image may be discarded per block 412. However corrupted files may be preprocessed by applying pre-processing algorithms 242 in an attempt to repair.

In some cases, preprocessing may be insufficient. For example, the generated color histogram indicates that the image is mostly dark, suggesting an obstructed camera. By way of another example, during Otsu segmentation, it may appear that the image does not contain enough segments indicating an image where sub-shapes could not be determined. To avoid the introduction of erroneous or corrupted images into classification and identification, especially where machine learning is applied, the image preprocessor software component 240 in block 410 will discard images in block 412 that fail to meet a predetermined threshold. Otherwise, processing continues on to classification.

Classification is the identifying of plant versus non-plant portions of the image. Classification begins with block 414 where discrete objects within the buffered image are discerned. One of the image preprocessor software component algorithms 242 will have generated as list of objects in the image by applying a segmentation algorithm such as Otsu segmentation. Specifically, different portions of the image will have been identified as discrete objects—i.e. contiguous sets of pixels corresponding to an item whose image was captured in the buffered image. If segmentation is not completed by the image preprocessor software component 240, then the classifier software component 244 may generate the discrete object list.

Once discrete objects are identified, in block 416, the classifier software component 244 will classify the discrete objects into plant and non-plant objects. In one embodiment after obtaining a discrete object list for the buffered image, the objects are sorted by size, from the largest to the smallest. A predetermined threshold N is specified. In this way, only the most significant items in the image will be processed. For example, discrete objects of one or two pixels may be ignored to lower processing load.

A rank value is then calculated for the N largest objects. The rank value generally relates to an indication that a discrete object's shape and color corresponds to an expected plant feature. Accordingly, metadata about the image, for example knowing that the buffered image is of a white daisy, moon-shaped white petals would be searched for by searching for that particular shape and color. An example rank value using contour area, inertia ratio and color was described with respect to the plant state vector with respect to FIG. 3.

After calculation of the rank values, the top X values, X being a predetermined threshold, will be deemed to be representing a plant in the image. In this way, only discrete objects deemed to represent the plant are differentiated from discrete objects deemed not to represent the plant in the buffered image.

After classification, the portions of the buffered image deemed to represent a target, or an item of interest in the image are processed by the identifier software component 246 and identifier algorithms 248 to identify the identity of the target in the image. While the target may be any item captured in the image, a person, a machine, and the like, generally the target will be a plant. The degree of identification may simply be to identify the genus and species of the plant in the buffered image. However, this information may also be in metadata already. The identification may also be of a particular plant e.g. the ninth red rose shrub out of a lot of twelve. Because information is stored on a per plant basis, some identification algorithms 248 may determine that an object is the same plant as in another image, but just moved or rotated.

In block 418, the identifier software component 246, may apply one or several algorithms 248 to segment the portions of the buffered image deemed to represent a plant (as opposed to the entire buffered image). Those portions may then be segmented, for example using Otsu segmentation. Where segments and attributes of the segments such as morphological attributes and color match a plant, a positive identification of the plant may be achieved.

Since the plant is comprised of a plurality of discrete objects, not only can the plant be identified, but discrete objects comprising the plant may be identified. Those discrete objects, such as petals and leaves comprise artifacts of the plant.

Prior to segmentation, the identifier software component 246 may apply additional preprocessing specific to the discrete objects deemed to represent a plant. Some of this preprocessing makes use of adaptive and iterative techniques. Those techniques are described with respect to FIG. 5.

Recall that during segmentation, artifacts comprising the plant in the buffered image were identified by the identification software component 246. Upon the commencement of analysis by the analyzer software component 250, in block 420, where the artifacts deviate from an expectation, subsequent analysis may further identify an issue with the identified plant. Identified issues may then be stored in block 422 in data store 452. In general, the original buffered image, metadata of the image, a plant state vector, data generated during preprocessing and other processing, and identified issues may be stored together in data store 452 during block 422.

At this point, an image will have been processed to identify a plant, the plant's artifacts, potential issues with the plant and will have been persisted. Accordingly, in block 424, processing may continue by queuing another image, and storing in the image buffer 238 for processing as described above.

Exemplary Adaptive Processing During Identification

Notwithstanding FIG. 4, image processing is not necessarily linear. In some cases, image processing may involve the aggregation, or the statistical combining of information from multiple images to create a baseline or basis to compare images and artifacts in images. Such a creation of a baseline, where the baseline may change as new images are processed is called adaptive processing.

Figure 5:
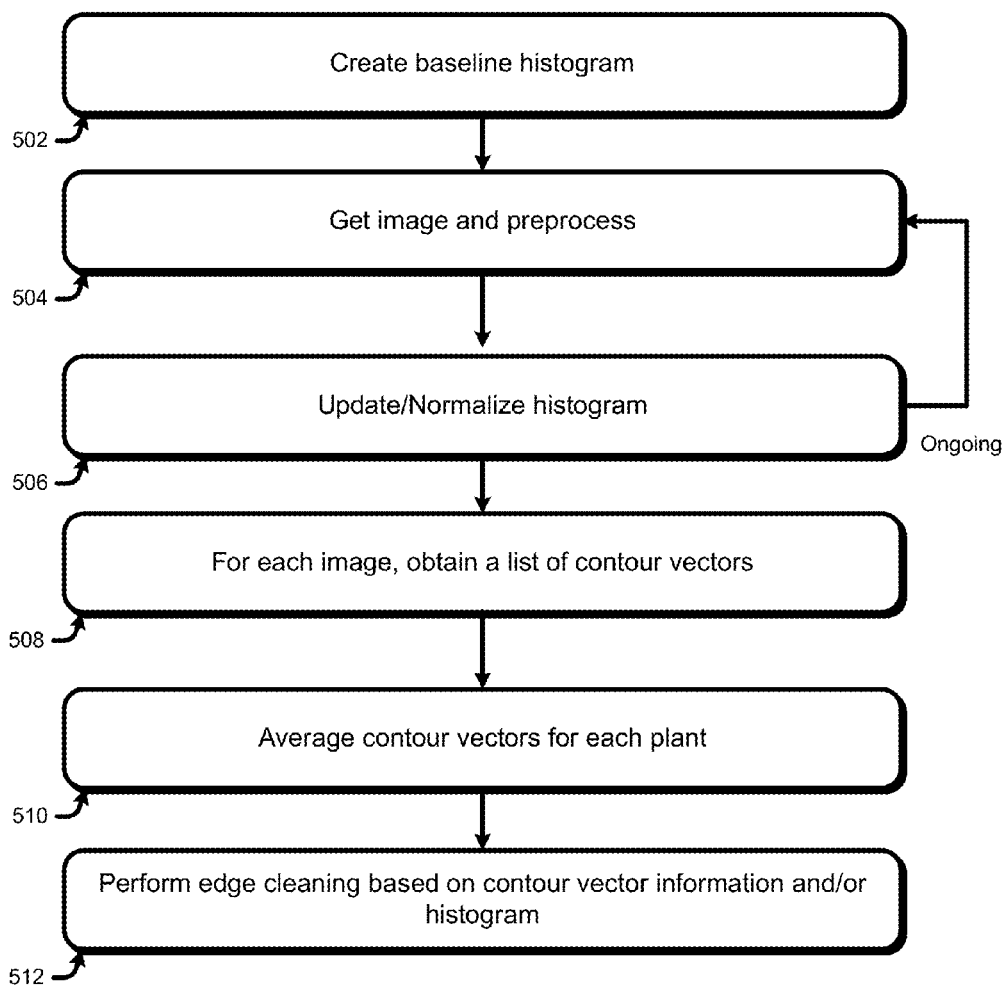
FIG. 5 is an exemplary flow chart of identification processing for object recognition based horticultural feedback analysis.

FIG. 5 is a flow chart 500 of an example of adaptive processing. Specifically, a color histogram is generated that captures statistically aggregated information over multiple images, and the adapting histogram is used during identification to refine artifacts of plants in an image. This process is sometimes called edge cleaning. Edge cleaning may be performed by the identifier software component 246 or may be performed by a separate software component.

In block 502 a histogram is initialized. Generally the variables of the histogram are set to zero, but a prior histogram may be used as well. This histogram will be adapted by adding information from additional images during processing.

As described with respect to FIG. 4, an image is retrieved, buffered and preprocessed. This is performed with respect to block 504. During preprocessing, histogram information, such as red-green-blue histogram information and/or hue-luminance-saturation information is extracted from the buffered image.

The extracted histogram information is then incorporated into the baseline histogram in block 506. The extracted histogram information may be added to the baseline histogram on a per variable basis. Alternatively, the added histogram information may be weighted. In this way, the baseline histogram adapts into a statistical aggregated of multiple images.

The baseline histogram generally will be calculated over a large number of images. It is not unusual for a full days of images to be aggregated into the baseline histogram prior to further processing of those images.

In block 506, when the histogram is deemed to have a critical mass of information, individual images may be processed. In one embodiment a list of contour vectors is created in block 508, and for each plant in the image the contour vectors are averaged in block 510.

In block 512, the contour information and/or the baseline histogram, after the baseline histogram is deemed to have sufficient information, is used to perform edge cleaning, or preprocessing steps to enhance artifacts of the plant in the buffered image.

At this point, the buffered image is ready for identification by the identification software component 246 as described with respect to FIGS. 2 and 4. Recall that the identification software component 246 performed ranking of artifacts. As per FIG. 3, one ranking value makes use of contour information and color information such as captured with respect to FIG. 5.

Figure 6:
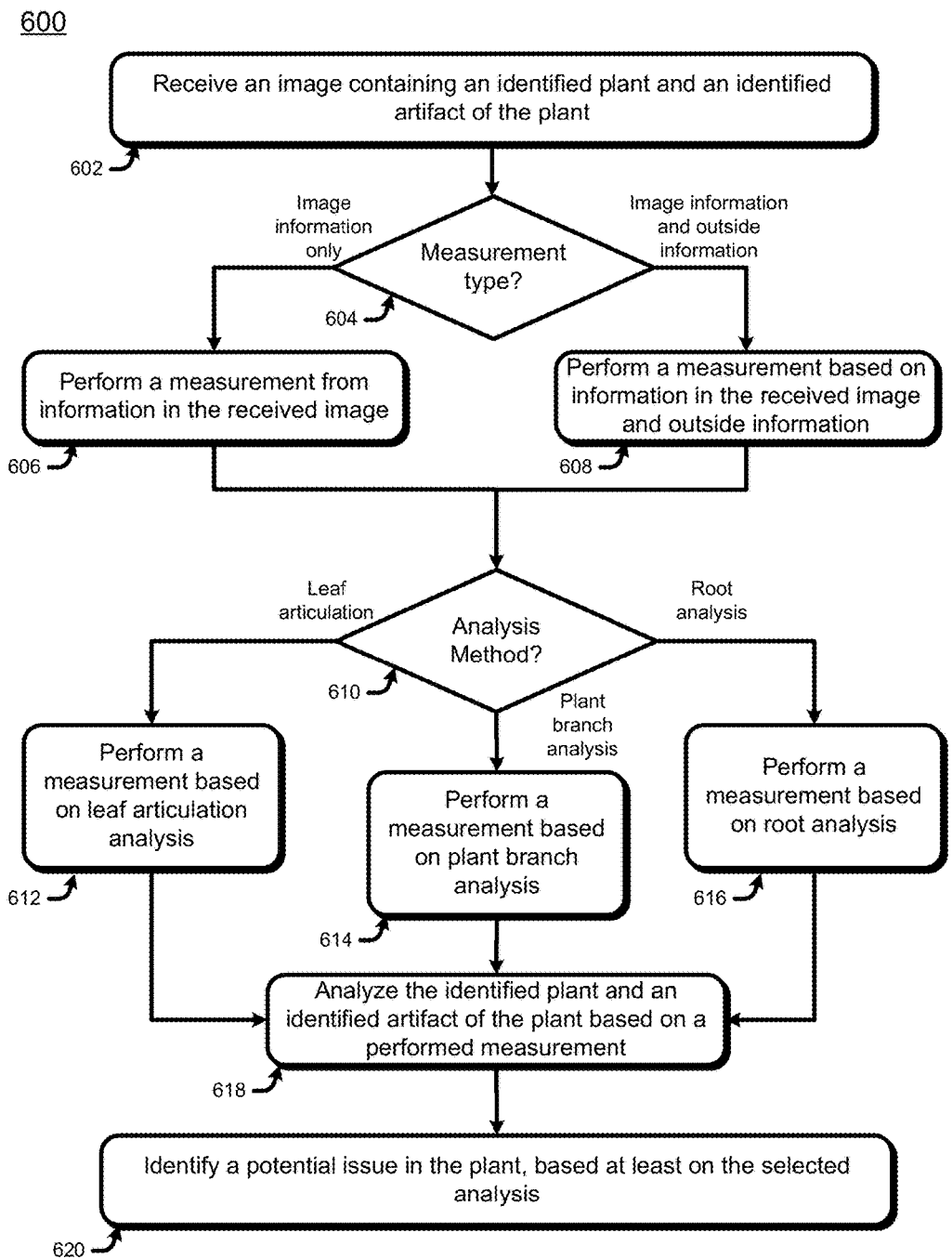
FIG. 6 is an exemplary flow chart of static analysis via object recognition based horticultural feedback analysis.

Exemplary Static Analysis for Object Recognition Based Horticultural Feedback Analysis After identification of a plant and artifact of the plant, the plant is then analyzed. Analysis may be static, specific to a single image, or sequential, an analysis of multiple images over time. Many times, an image information extracted or generated from an image is aggregated with other static analysis information from other images which subsequently are collectively subjected to sequential analysis. FIG. 6 is a flow chart 600 of a framework for static analysis.

Static analysis is the analysis with a single image as its subject. In block 602, an image where a plant, and an artifact of the plant has been identified, usually by the identifier software component 246. Because the analysis involves a single image, some analyses may supplement information with information not in the image itself. In block 604, a determination is made whether outside information is to be used in a measurement. If so, that information is obtained. Example outside information includes metadata, administrative intervention, information within the plant state vector, and/or a pre-calculated histogram such as described with respect to FIG. 5.

If the measurement uses information solely in the image, then the measurement is performed in block 606. Otherwise, the measurement, including the outside information as well as information in the image is performed in block 608.

Once the measurement is made, the measurement is analyzed in block 610. Different analyses may be brought to bear. Examples include leaf articulation analysis in block 612, plant branch analysis in block 614, and root analysis in block 616.

Leaf articulation analysis is the study of the orientation of artifacts identified as leaves of a plant. Generally, leaves are expected to turn towards the source of light. Where leaves fail to do so, or not enough leaves do so, an issue of the plant may be identified.

Plant branch analysis is the generation of a computer representation of the size and orientation of the branches of a plant. Similar analysis may be made of roots, or even the veins on a leaf. General branch analysis is also known as component modeling.

Leaf articulation, plant branch, and root analysis measurements may be simply made and analyzed in isolation as in block 618. Where an issue is identified in block 620, the identified issue may be stored in data store 252 for subsequent reporting. Alternatively, the results of the static analysis, or may be compared to subsequent analyses of the plant as part of sequential analysis. Sequential analysis is described with respect to FIG. 7.

Figure 7:
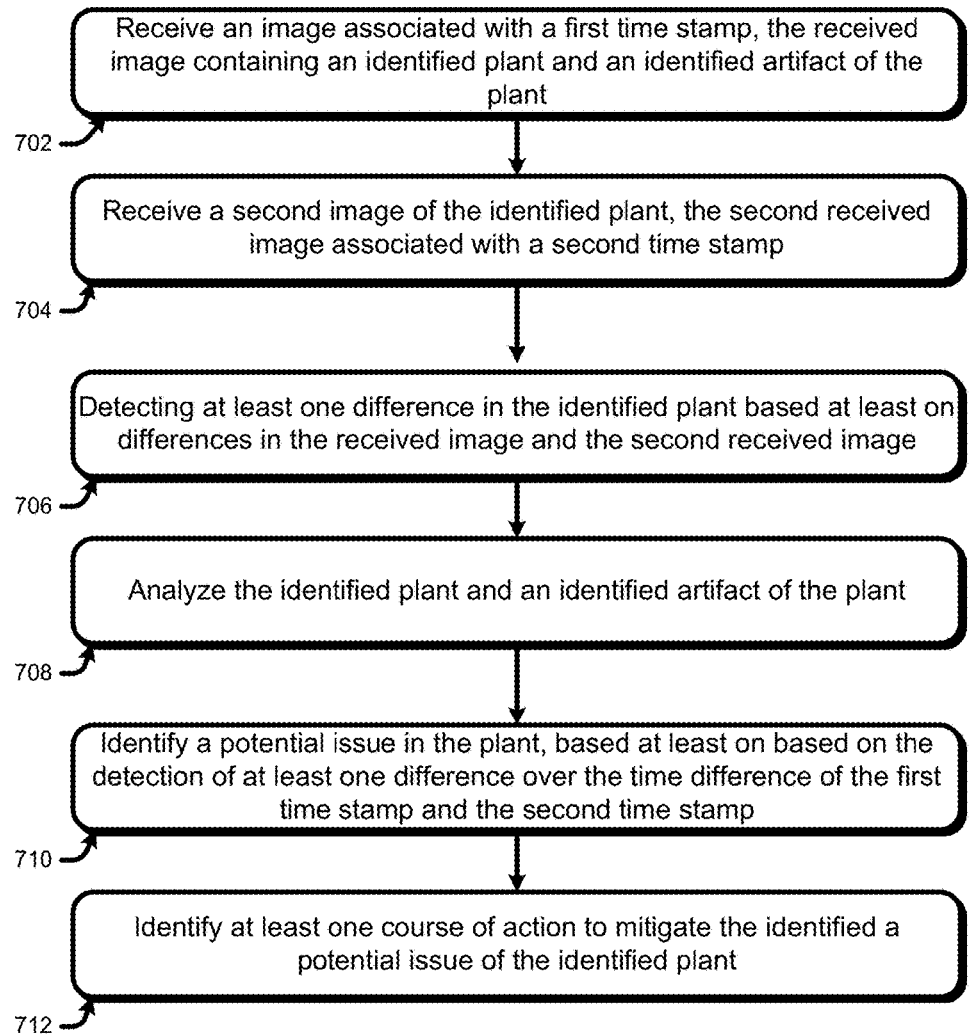
FIG. 7 is an exemplary flow chart of sequential analysis via object recognition based horticultural feedback analysis.

Exemplary Sequential Analysis for Object Recognition Based Horticultural Feedback Analysis As stated above, sequential analysis differs from static analysis in that sequential analysis makes use of multiple images over time. Generally the analysis is comparative in nature. FIG. 7 is a flow chart 700 of a framework for sequential analysis.

In block 702, an image containing a plant and at least one plant artifact is received with a time stamp, and in block 704, a second image also containing a plant and at least one plant artifact is received with a second time stamp.

In block 706, the images are compared and at least difference is identified. Here, the comparison is not merely of two images, but of any metadata, any pre-calculated or pre-generated information on the images including the plant state vector may be compared. For example, the plant state vectors within the two images may be compared. By way of another example, if static analysis was performed on the image and the second image, for example a branch representation was generated as part of branch analysis, a comparison of the images may include a comparison of the respective branch analyses.

In fact, information on the image may be generated from the metadata and/or pre-calculated or pre-generated information, and that information may be compared. For example, the color information in the plant state vector may be used to generate values for both the image and the second image, and that information may be compared as well.

Note that information on the images includes information of artifacts comprising the respective plants. Accordingly, while a comparison between the two images may be made of the plant as a whole, the receiving of images with an identified plant artifact enables comparison on a per artifact basis.

In block 708, the identified difference is analyzed. Analysis may come in several types. One analysis is to confirm that the plants compared are indeed the same plant. In this way, comparing the two images is validated. Another analysis is to perform continuity analysis, which is the identification of particular causes for a change.

One embodiment of validation analysis is to perform 2+1 analysis. For the plant in the first image and the plant in the second image, a vector is generated for each plant image. Because generally the images are from the same image capture device, a measurement of the Euclidean distance between the plants may be calculated. Where the distance is over a predetermined threshold, a determination of whether the plant was simply moved and/or rotated may be made, thereby confirming that the plant identified in the image and second image is the same plant, and may therefore be compared.

In block 710, issues may be identified based on the analysis. Where changes in values, such as motion, are above a predetermined threshold, continuity analysis, or the identification of causes of the change may be brought to bear. Data store 252 may contain a database of image artifacts corresponding to likely diagnoses as well as potential remediation courses of action. Where an artifact is seen to develop over time, and the change exceeds a predetermined threshold, in block 712, the data store 252 database may be searched for a diagnosis and/or remediation course of action.

Note that sequential analysis need not be only of two images. Analysis of images of the plant may help diagnose issues in that plant. However, it is also desirable to detect trends across an entire grow operation. Accordingly in addition to comparing images of the same plant, comparisons may be made of similarly situated plants. For example, other plants of the same species in the same grow operation, may be searched for indications of any identified issues in a single plant.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device to detect anomalies on a plant, the computing device comprising:
a processor;
a memory communicatively coupled to the processor, the memory storing a set of software components, comprising:
an image retriever software component, which when executed by the processor, directs the computing device to receive a plurality of images from one or more grow operations;
a classifier software component, which when executed by the processor, directs the computing device to identify a plurality of discrete objects in a first image of the plurality of images as portions of the first image that represent an individual plant present in one of the one or more grow operations;
an identifier software component, which when executed by the processor, directs the computing device to:
identify the individual plant as a same plant previously identified by the computing device based on at least one of the discrete objects; and
identify at least one artifact of the individual plant based on at least one of the discrete objects; and
an analyzer software component, which when executed by the processor, directs the computing device to:
select an analysis method from among a plurality of analysis methods based on the identification of the at least one artifact;
analyze the at least one artifact, via the selected analysis method, to identify at least one issue of the individual plant; and
store the at least one issue of the individual plant, wherein storing identified issues includes storing the identified issues on a per plant basis.

2. The computing device of claim 1, wherein the set of software components further comprises:
an image preprocessor software component, which when executed by the processor, directs the computing device to perform at least one of the following:
a histogram generation of red-green-blue (RGB) measurements of the first image;
a histogram generation of hue-luminance-saturation (HLS) measurements of the first image;
an iteration count of morphological opens and/or closes of the first image;
a Gaussian blur transformation of the first image; and
an application of Otsu segmentation to the first image.

3. The computing device of claim 2, wherein the image preprocessor software component is further configured to determine whether the first image has sufficient content for further processing.

4. The computing device of claim 1, wherein the classifier software component is further configured to direct the computing device to:
separate the identified discrete objects representing plants from identified discrete objects not representing plants based on size, color, inertia ratio, and/or contour area.

5. The computing device of claim 1, wherein the identifier software component is further configured to direct the computing device to:
identify the individual plant based on a plant state vector comprised of variables that are translation and transformation invariant; and
identify the individual plant as the same plant previously identified regardless of whether the individual plant has been moved or rotated.

6. The computing device of claim 5, wherein the plant state vector variables include at least some of the following:
contour area;
inertia area;
color histogram;
Hu moments;
leaf count; and/or
leaf configuration.

7. The computing device of claim 1, wherein the analyzer software component is further configured to direct the computing device to:
identify at least one course of action to mitigate the at least one issue; and
provide the at least one course of action to the one grow operation.

8. The computing device of claim 7, wherein providing the at least one course of action to the one grow operation comprises communicating with the one grow operation to adjust a light spectrum or intensity of light provided to the individual plant by a lumière feedback device included in the one grow operation.

9. The computing device of claim 1, wherein selecting the analysis method from among the plurality of analysis methods comprises:
selecting a leaf articulation analysis in response to identifying the at least one artifact as a leaf of the individual plant, wherein analyzing the at least one artifact via the leaf articulation analysis comprises determining an orientation of the leaf of the individual plant with respect to a light source;
selecting a plant branch analysis in response to identifying the at least one artifact as a branch of the individual plant, wherein analyzing the at least one artifact via the plant branch analysis comprises generating a representation of a size and orientation of the branch of the individual plant; and
selecting a root analysis in response to identifying the at least one artifact as a root of the individual plant, wherein analyzing the at least one artifact via the root analysis comprises determining a structure of the root of the individual plant.

10. A method to identify potential issues in a plant, comprising:
receiving, at a computing device, a plurality of images from one or more grow operations;
identifying, by the computing device, a plurality of discrete objects in a first image of the plurality of images as portions of the first image that represent an individual plant present in one of the one or more grow operations;
identifying, by the computing device, the individual plant as a same plant previously identified in a second image by the computing device based on at least one of the discrete objects;
identifying, by the computing device, a first plurality of artifacts of the individual plant based on at least one of the discrete objects identified in the first image;
comparing the first plurality of artifacts corresponding to the first image with a second plurality of artifacts corresponding to the second image on a per artifact basis to detect at least one difference in the individual plant;

identifying at least one issue of the individual plant based on the detection of the at least one difference in the individual plant; and storing the at least one issue of the individual plant, wherein storing identified issues includes storing the identified issues on a per plant basis.

11. The method of claim 10, wherein identifying the individual plant as the same plant is based on a plant state vector, and wherein identifying at least one artifact of the first plurality of artifacts is based on an edge cleaner software component operation.

12. The method of claim 10, wherein the first image is associated with a first time stamp and the second image is associated with a second time stamp.

13. The method of claim 10, wherein the detected at least one difference in the individual plant comprises a Euclidean distance measure of the individual plant.

14. The method of claim 13, further comprising:
determining whether the Euclidean distance measure is greater than a predetermined threshold; and
determining whether the individual plant was moved or rotated in response to the Euclidean distance measure being greater than the predetermined threshold to confirm that the individual plant in the first image is the same plant as the individual plant in the second image.

15. The method of claim 10, further comprising:
identifying at least one course of action to mitigate the at least one issue; and
providing the at least one course of action to the one grow operation.

16. The method of claim 15, wherein providing the at least one course of action to the one grow operation comprises communicating with the one grow operation to adjust a light spectrum or intensity of light provided to the individual plant by a lumière feedback device included in the one grow operation.

17. A non-transitory computer-readable media storing instructions, which when executed by at least one processor of a computing device, direct the computing device to:
receive a plurality of images from one or more grow operations;
collect histogram data over the plurality of images for images that are of a same category;
generate an average histogram based on the collected histogram data;
receive a subsequent image from the one or more grow operations;
identify a plurality of discrete objects in the subsequent image as portions of the subsequent image that represent an individual plant present in one of the one or more grow operations;
identify the individual plant as a same plant previously identified by the computing device based on at least one of the discrete objects;
identify at least one artifact of the individual plant based on at least one of the discrete objects and based on the average histogram;
recalculate the average histogram using a histogram of the subsequent image;
analyze the at least one artifact to identify at least one issue of the individual plant; and
store the at least one identified issue of the individual plant, wherein storage of the at least one identified issue includes storing a plurality of identified issues on a per plant basis.

18. The non-transitory computer-readable media of claim 17, further comprising instructions to direct the computing device to:
identify the individual plant as the same plant previously identified regardless of whether the individual plant has been moved or rotated.

19. The non-transitory computer-readable media of claim 17, further comprising instructions to direct the computing device to:
identify at least one course of action to mitigate the at least one identified issue; and
communicate the at least one course of action to the one grow operation to adjust a light spectrum or intensity of light provided to the individual plant by a lumière feedback device included in the one grow operation.

* * * * *